(12) United States Patent
Slight (10) Patent No.: US 10,864,950 B2
(45) Date of Patent: Dec. 15, 2020

(54) MOVEABLE UNDERSLUNG WING

(71) Applicant: McLaren Automotive Limited, Surrey (GB)

(72) Inventor: Arthur Danny Slight, Surrey (GB)

(73) Assignee: McLaren Automotive Limited, Woking (GB)

( * ) Notice: Subject to any disclaimer, the term of this patent is extended or adjusted under 35 U.S.C. 154(b) by 77 days.

(21) Appl. No.: 16/213,584

(22) Filed: Dec. 7, 2018

(65) Prior Publication Data

US 2019/0176909 A1   Jun. 13, 2019

(30) Foreign Application Priority Data

Dec. 8, 2017 (GB) .................................. 1720532.9

(51) Int. Cl.
| | | |
|---|---|---|
| *B62D 35/00* | (2006.01) | |
| *B62D 35/02* | (2006.01) | |
| *B62D 37/02* | (2006.01) | |

(52) U.S. Cl.
CPC ........... *B62D 35/007* (2013.01); *B62D 35/02* (2013.01); *B62D 37/02* (2013.01)

(58) Field of Classification Search
CPC ....... B62D 35/007; B62D 35/02; B62D 37/02
See application file for complete search history.

(56) References Cited

U.S. PATENT DOCUMENTS 8,944,489 B2 * 2/2015 Patterson .................. B60T 1/16
                                                   180/903
2004/0256885 A1 12/2004 Bui (Continued)

FOREIGN PATENT DOCUMENTS

DE   20 2015 105527 U1   12/2015
EP        1 601 568 B1    1/2008

(Continued)

OTHER PUBLICATIONS

UK Search Report for corresponding GB Appl No. 1720532.9 dated Jun. 5, 2018.

(Continued)

*Primary Examiner* — Lori L Lyjak (74) *Attorney, Agent, or Firm* — Fish & Richardson P.C.

(57) ABSTRACT

A vehicle, comprising: a vehicle body; a wing having an upper side and a front; a wing support mounted between the vehicle body and the wing, the wing support extending from the upper side of the wing, around the front of the wing, to the vehicle body and being pivotally attached to the wing at a first location on the wing so that the first location is positionally fixed relative to the wing support and the wing can rotate between a first position and a second position; a linear actuator for moving the wing between the first position and the second position; and a linkage pivotally attached to the wing at a second location forwards of the first location and coupled to the linear actuator so that the linear actuator can move the wing between the first position and the second position; wherein the wing is capable of imposing a downforce on the wing support acting through a centre of pressure of the wing as a result of the action of rearward airflow on the wing and the centre of pressure is located rearwards of the first location irrespective of the position of the wing.

20 Claims, 5 Drawing Sheets

(56) References Cited

U.S. PATENT DOCUMENTS

2006/0055204 A1 3/2006 Mathew
2016/0159412 A1 6/2016 Oxley et al.

FOREIGN PATENT DOCUMENTS

| GB | 2079688 | 1/1982 |
| GB | 2518611 | 4/2015 |
| WO | WO 2011/029640 | 3/2011 |
| WO | WO 2011/029840 A1 | 3/2011 |
| WO | WO 2015/060554 | 4/2015 |

OTHER PUBLICATIONS

European Search Report for corresponding EP Appl No. 18211151.8, dated May 17, 2019.

* cited by examiner

MOVEABLE UNDERSLUNG WING

CROSS-REFERENCE TO RELATED APPLICATION

This application claims priority under 35 U.S.C. § 119 to Great Britain (GB) Application No. 1720532.9, filed Dec. 8, 2017. The contents of this application is hereby incorporated by reference in its entirety.

TECHNICAL FIELD

This invention relates to a vehicle comprising a variable aerodynamic device, for example a wing and/or air brake.

BACKGROUND

Many cars are fitted with fixed aerodynamic devices to improve downforce or reduce drag. Some of these can be adjusted and then re-fixed in place whilst the car is stopped. Other cars have aerodynamic devices that can be adjusted whilst the car is in motion. Such aerodynamic devices may be positioned at a rear portion of the vehicle so as to improve downforce or reduce drag at the rear of the vehicle. The aerodynamic devices tend to have one or more wing elements over which air can flow when the vehicle is in motion. The profile of these wing elements controls the flow of air as it passes them. To create downforce, the profile of the wing elements is such that the air passing along the undersides of the wing elements is accelerated relative to air passing along the upper sides of the wing elements. This causes lower pressure under the wing which results in a downwards force to be generated by the wing.

Generally, moveable aerodynamic devices are supported from the underside of the aerodynamic device because it is easier to configure the actuators and supports needed to support the aerodynamic device. One such aerodynamic device is described in WO 2011/029640. By supporting the aerodynamic device from the underside, this reduces the area of the undersides of the wing elements and so reduces the downforce that can be generated by the wing.

Aerodynamic devices can be supported on the upper side of the aerodynamic device with the support wrapping around the wing elements to attach to the vehicle body. Such aerodynamic devices can be referred to as an underslung wing. However, such aerodynamic devices are not typically capable of being adjusted whilst the car is in motion. This is because it is difficult to configure the actuators and supports required to support an aerodynamic device from above.

Therefore, it would be desirable to have a vehicle with a variable aerodynamic device that presents an undisrupted underside surface area to air flowing past the aerodynamic device.

SUMMARY

According to a first aspect of the present invention there is provided a vehicle, comprising: a vehicle body; a wing having an upper side and a front; a wing support mounted between the vehicle body and the wing, the wing support extending from the upper side of the wing, around the front of the wing, to the vehicle body and being pivotally attached to the wing at a first location on the wing so that the first location is positionally fixed relative to the wing support and the wing can rotate between a first position and a second position; a linear actuator for moving the wing between the first position and the second position; and a linkage pivotally attached to the wing at a second location forwards of the first location and coupled to the linear actuator so that the linear actuator can move the wing between the first position and the second position; wherein the wing is capable of imposing a downforce on the wing support acting through a centre of pressure of the wing as a result of the action of rearward airflow on the wing and the centre of pressure is located rearwards of the first location irrespective of the position of the wing.

The wing may have a rear and the wing support may not pass around the rear of the wing. The vehicle may comprise a rocker pivotally mounted to the wing support, wherein the linkage may be coupled to the linear actuator by the rocker. The linkage may be pivotally attached to the rocker at one end of the rocker and the linear actuator may be pivotally attached to the rocker at the other end of the rocker. The rocker may be pivotally mounted to the wing support between where the rocker is attached to the linkage and where the rocker is attached to the linear actuator.

The wing support may comprise an outer shell. The linear actuator may be housed inside the outer shell of the wing support. The linkage may be housed inside the outer shell of the wing support. The rocker may be housed inside the outer shell of the wing support.

The vehicle may comprise a mount for the linear actuator and the linear actuator may be pivotally attached to the mount. The mount may be part of the wing support. The mount may be part of the vehicle body.

Irrespective of the position of the wing the wing may cause a positive force to be exerted on the linear actuator as a result of the action of rearward airflow on the wing. The linear actuator may comprise a chamber, a piston dividing the chamber into a first volume and a second volume, the piston may be moveable along the length of the chamber to vary the size of the first and second volumes, and a piston rod coupled to the piston so that the piston rod moves with the piston, the piston rod may be coupled to the linkage. The linear actuator may comprise a first connection between the first volume and the exterior of the linear actuator, and a second connection between the second volume and the exterior of the linear actuator, the connections may be capable of providing coupling for fluid within the chamber with apparatus external to the linear actuator, wherein one of the connections may be provided with a variable restriction to adjust the flow of fluid through the connection.

The wing may be configured so that in the first position the wing is streamlined so as to be capable of imposing a low rearward force on the vehicle body as a result of the action of rearward airflow on the wing relative to the rearward force imposed on the vehicle body when the wing is in the second position. The wing may be configured so that in the second position the wing is capable of imposing a high downforce on the vehicle body as a result of the action of rearward airflow on the wing relative to the downforce imposed on the vehicle body when the wing is in the first position. The wing may comprise a main wing element and the wing support may be mounted between the vehicle body and the main wing element. The wing may comprise a plurality of wing elements. The wing element(s) may have profile(s) such that in the first position the wing is streamlined so as to be capable of imposing a low rearward force on the vehicle body as a result of the action of rearward airflow on the wing relative to the rearward force imposed on the vehicle body when the wing is in the second position. The wing element(s) may have profile(s) such that in the second position the wing is capable of imposing a high downforce on the vehicle body as a result of the action of rearward airflow on the wing relative to the downforce imposed on the vehicle body when the wing is in the first position. The wing may comprise wing tip elements oriented perpendicular to the wing element(s). The wing support may be mounted to the vehicle body at a rear portion of the vehicle body.

The vehicle may comprise: a second wing support mounted between the vehicle body and the wing, the second wing support may extend from the upper side of the wing, around the front of the wing, to the vehicle body and may be pivotally attached to the wing at a third location on the wing so that the third location is positionally fixed relative to the wing support and the wing can rotate between a first position and a second position; a second linear actuator for moving the wing between the first position and the second position; and a second linkage pivotally attached to the wing at a fourth location forwards of the second location and coupled to the linear actuator so that the linear actuator can move the wing between the first position and the second position; wherein the wing may be capable of imposing a downforce on the wing support acting through the centre of pressure of the wing as a result of the action of rearward airflow on the wing and the centre of pressure is located rearwards of the third location irrespective of the position of the wing. The first and second wing supports may be positioned either side of a centreline of the vehicle. The first and third locations may be co-planar, and the second and fourth locations may be co-planar. The pivotal attachment of the first wing support to the wing and the pivotal attachment of the second wing support to the wing may share a common axis.

BRIEF DESCRIPTION OF THE FIGURES

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising a VAD. The VAD has a wing that can be moved continuously between a first position and second position. The wing rotates about a pivot point located on a wing support. The wing rotates about the pivot point located on the wing support so that the position of the pivot point is fixed relative to the body of the vehicle. The wing is moved by a linear actuator associated with each wing support. The centre of pressure of the wing is such that it is located rearward of the pivot point located on the wing support at all rotational positions of the wing. The VAD can be referred to as having an underslung wing. The underslung wing may be rotatable between a first and second position.

Figure 1:
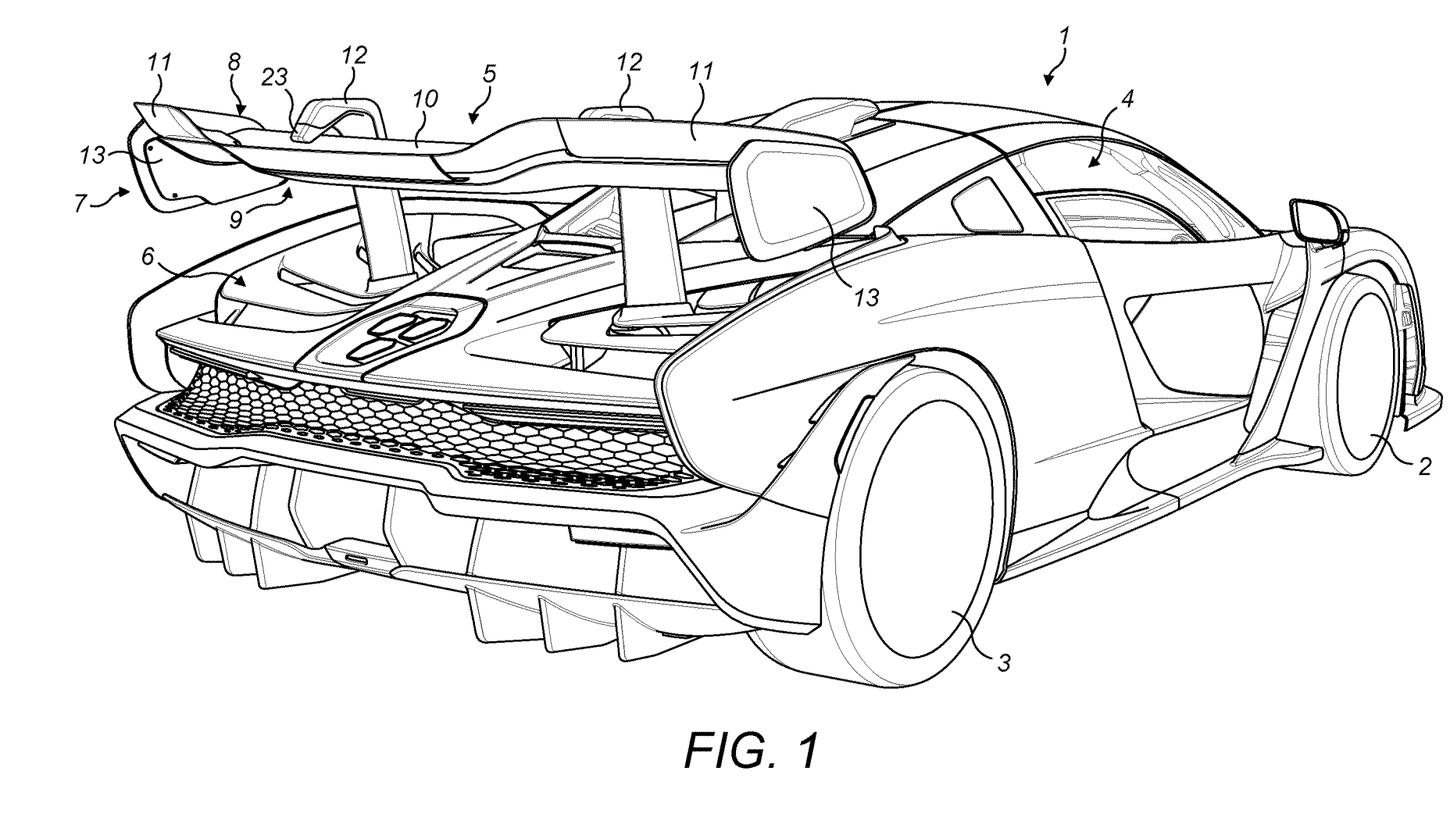
FIG. 1 shows a rear three-quarters view of a vehicle comprising a variable aerodynamic device (VAD).
Figure 2:
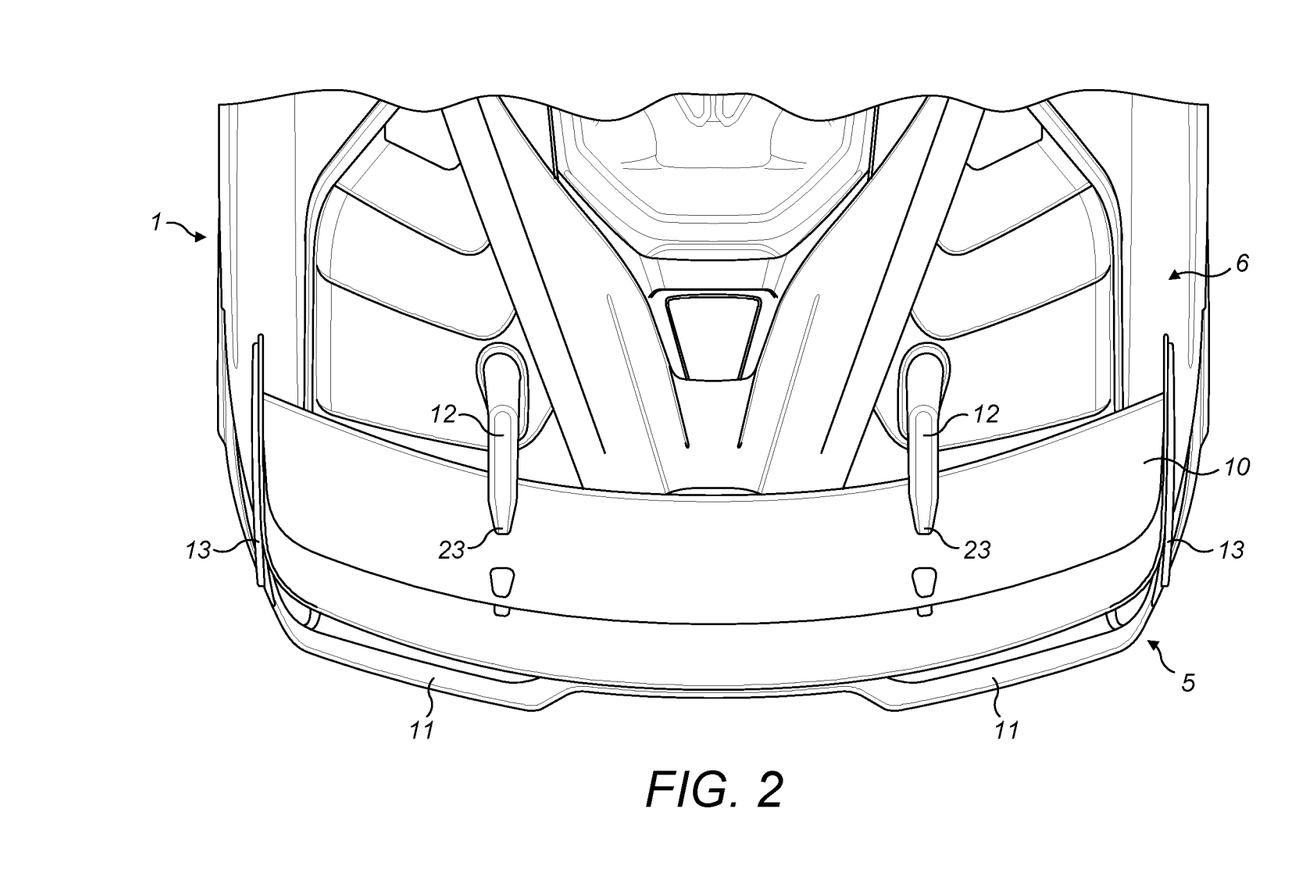
FIG. 2 shows a plan view of a rear portion of the vehicle comprising a VAD.

FIGS. 1 and 2 show a vehicle 1. The vehicle may be a car. The vehicle 1 comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises a passenger compartment 4. The passenger compartment 4 may comprise one or more seats for occupants of the vehicle to sit in. The passenger compartment 4 may accommodate a driver. The passenger compartment may accommodate one or more passengers. The vehicle 1 may comprise controls located within the passenger compartment 4 to enable an occupant to control the motion of the vehicle.

The vehicle 1 comprises one or more aerodynamic devices. As shown in FIG. 1, the vehicle 1 comprises a rear VAD 5. The rear VAD 5 is mounted to the body of the vehicle 6. The rear VAD 5 is mounted to a rear portion of the body of the vehicle 6. The vehicle body 6 may be the collection of parts that form the main structure of the vehicle 1. Thus, the rear VAD 5 is attached to the vehicle body 6 so that the VAD 5 can provide force to the vehicle body. The VAD 5 can thus apply a downforce to the vehicle body when there is a rearward flow of air over the variable aerodynamic device 5.

The VAD 5 comprises a horizontally extending wing 7. The wing 7 extends laterally across at least part of the vehicle's width. The wing 7 is aerodynamically profiled so that its cross-sectional shape is capable of providing the downforce effects described herein. The wing 7 has an upper side 8 which is oriented generally in an upwards direction facing away from the running surface on which the vehicle 1 is supported. The wing 7 has an underside 9 which is oriented generally in a downwards direction facing towards the running surface on which the vehicle 1 is supported. As described herein, the wing 7 is rotatable between a first position and a second position. Thus, the upper 8 and lower 9 sides may not point directly upwards and downwards in all positions but nonetheless will generally be oriented in opposite directions with one primarily oriented in an upwards direction and one primarily oriented in a downwards direction. The wing may move through 30 degrees of rotation between the first and second positions. The wing may move through 20, 25, 35, 40 degrees of rotation between the first and second positions. The first position may have a wing pitch angle of −10 degrees, −5 degrees or 0 degrees. The second position may have a wing pitch angle of 15 degrees, 20 degrees, 25 degrees or 30 degrees. The wing pitch angle of the first and second positions may be selected to give a required range of downforce provided by the rear wing 7.

The wing 7 may comprise one or more wing elements. As shown in FIGS. 1 and 2, the wing 7 comprises a primary wing element 10 and one or more secondary wing elements 11. The primary wing element 10 and secondary wing elements 11 may be attached together. In other examples, some of the wing elements may be capable of moving relative to other wing elements to vary the aerodynamic properties of the wing 7. The wing 7 also comprises two wing tip elements 13 which are oriented substantially perpendicular to the wing element(s) 10, 11. The wing elements 10, 11 are aerodynamically profiled so that their cross-sectional shape is together capable of providing the downforce effects described herein.

On either side of the wing 7, the VAD 5 has support structure by means of which it is mounted to the body 6 of the vehicle 1. The support structure has means to rotate the wing 7 between a first position and a second position. Each support structure comprises a wing support 12 mounted between the vehicle body 6 and the wing 7. The wing support 12 extends from the upper side 8 of the wing 7 and thus is mounted to the wing 7 via the upper side 8 of the wing 7. The wing support 12 is not connected to the underside 9 of the wing 7 and thus does not extend from the underside of the wing 7. This thus means that airflow over the underside 9 of the wing 7 is not impeded by there being any connection to a support structure. This makes the VAD 5 more efficient at providing downforce because the underside 9 of the wing is the suction side of the wing and so the airflow over the underside is liable to separate from the areas where the support structure would join the wing whereas there is no separation risk on the upper, high-pressure side surface. The separation of the flow from the underside reduces wing performance and efficiency. Therefore, by not having any connection from the underside 9 of the wing to the support structure the wing performance and efficiency is improved.

As shown in FIGS. 1 and 2, the wing 7 comprises a primary wing element 10 and the wing support is mounted between the vehicle body 6 and the primary wing element 10. Thus, the wing support can extend from the upper surface of the primary wing element 10.

The wing support 12 extends from the upper side of the wing around the front of the wing to the vehicle body. The front of the wing is the part that points in the primary motion direction of the vehicle 1. The wing support 12 does not pass around the rear of the wing 1. The body of the wing support 12 may be profiled so as to streamline the air around the wing support 12 to attempt to provide minimum disruption to the rearward flow of air past the wing support when the vehicle 1 is in forward motion. The left and right wing supports 12 may be configured in a like manner.

Figure 3A:
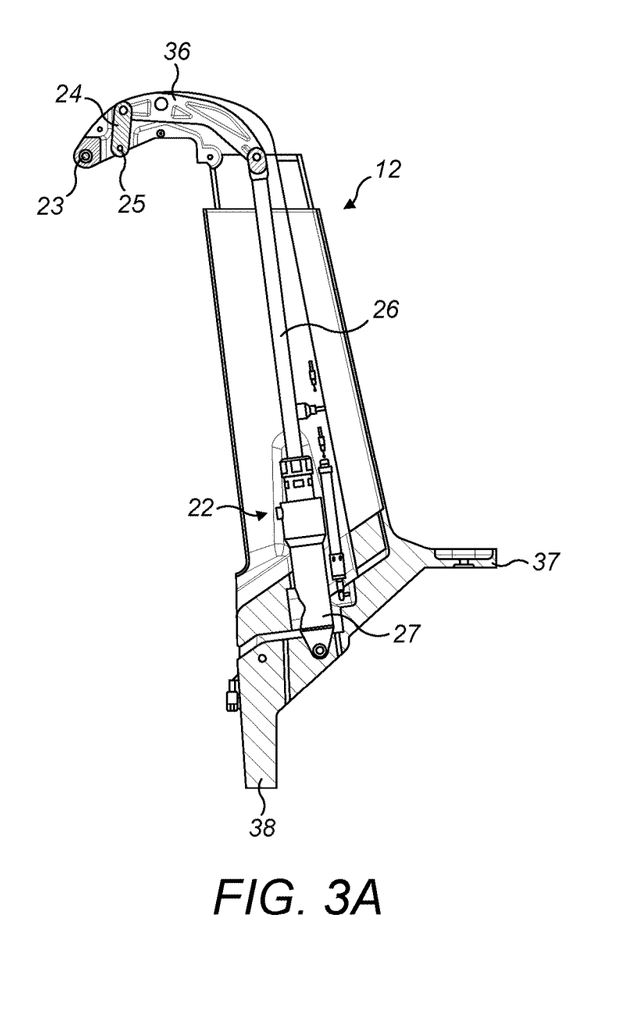
FIGS. 3A and 3B show schematic views of a wing support and associated components.
Figure 3B:
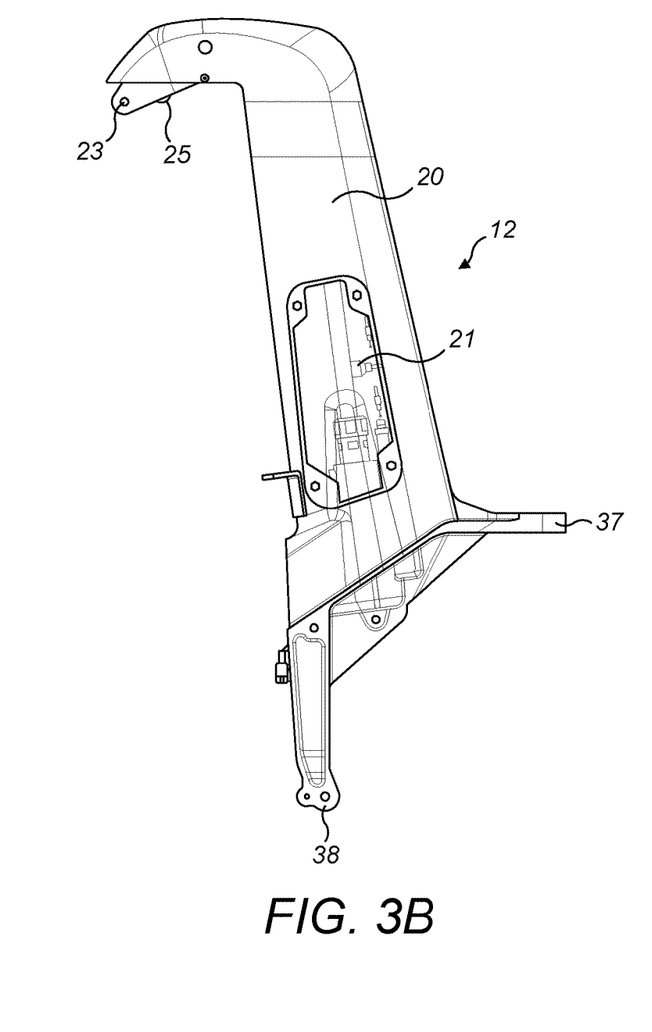

FIGS. 3A and 3B show a wing support 12 and the components associated with the wing support 12 in more detail. FIG. 3A shows a view of the wing support 12 without the outer shell 20 of the wing support 12 being present. FIG. 3B shows a view of the wing support 12 with the outer shell 20 of the wing support 12 being present. The outer shell 20 may be formed of one or more separate parts to enclose the internal structure and at least some of the components provided with the wing support 12. During operation one or more of the components, or part of them, may extend outside of the outer shell 20 constantly or during some of the motion range of the wing 7. As shown in FIG. 3B, the outer shell 20 may comprise one or more access panels 21 to provide access to the internal area of the wing support. The wing support has a swan-neck profile running between the wing 7 and the vehicle body 6.

The wing support 12 is pivotally attached to the wing 7 at a first location 23 on the wing 7. In the example shown in FIGS. 1 and 2, the wing support is pivotally attached to the primary wing element 10. In either case, this means that the wing 7 is positionally fixed relative to the wing support 12 and able to rotate between a first position and a second position relative to the wing support 12. The wing support 12 is a rigid wing support 12 therefore the position of the first location 23 relative to the vehicle body 6 is fixed. The position of the first location 23 relative to the vehicle body 6 is fixed irrespective of the rotational position of the wing 7.

The vehicle comprises a linear actuator 22 associated with each wing support for moving the wing between the first position and the second position. The linear actuator 22 is coupled to a linkage 24 which is pivotally attached to the wing at a second location 25 forwards of the first location 23. The linkage 24 is coupled to the linear actuator 22 so that the linear actuator 22 can move the wing between the first position and the second position. The linkage 24 may be a strut.

Figure 4:
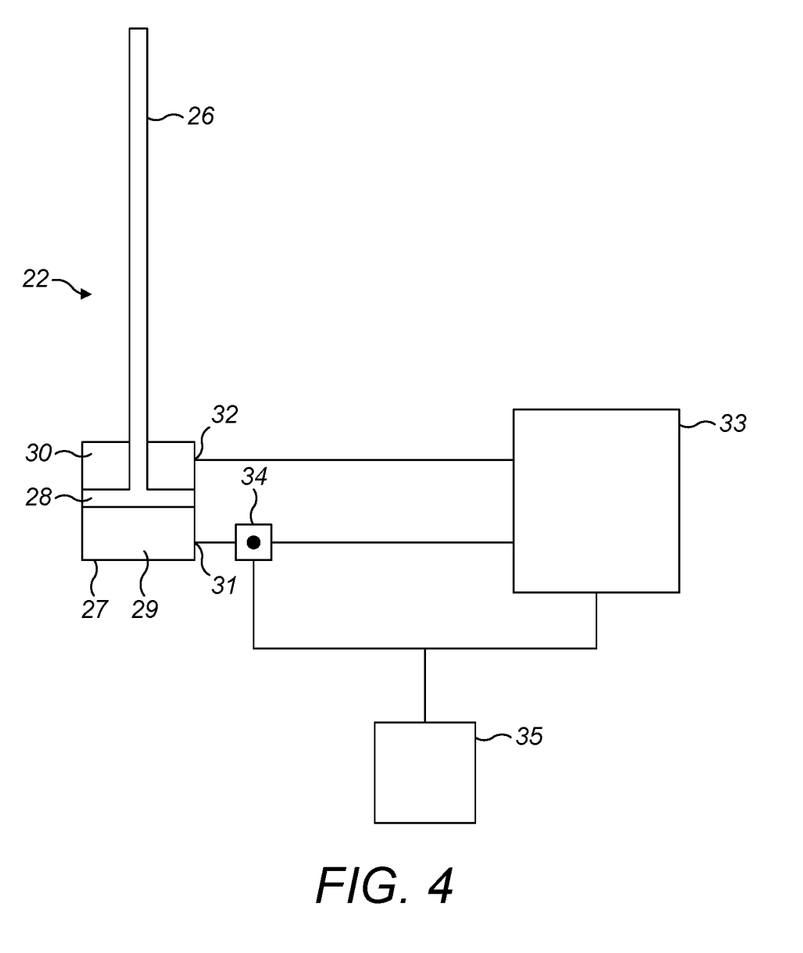
FIG. 4 shows a schematic diagram showing a configuration of a linear actuator.

The linear actuator 22 may be a hydraulic ram. The linear actuator 22 comprises a piston rod 26 and a cylinder 27. As shown in FIG. 4, the piston rod 26 is attached to a piston 28 which divides the cylinder 27 into a first volume 29 and a second volume 30. The piston 28 is moveable along the length of the chamber to vary the size of the first and second volumes. As the piston rod 26 is coupled to the piston 28 the piston 28 moves with the piston. As shown in FIG. 3A, the piston rod 26 is coupled to the linkage 25 at the distal end of the piston rod 26. The linear actuator 22 is shown as being pivotally attached to the wing support 12 however the linear actuator 22 may instead be attached to the vehicle body 6. The linear actuator 22 being attached to the wing support 12 is advantageous as it means that the wing support and associated control mechanism can be installed as one part.

The linear actuator 22 comprises a first connection 31 between the first volume 29 and the exterior of the linear actuator 22 and a second connection 32 between the second volume 30 and the exterior of the linear actuator 22. The connections are capable of providing coupling for fluid within the chamber with apparatus external to the linear actuator. The connections are connected to a hydraulic supply 33. The hydraulic supply 33 could come from another part of the vehicle 1, for example from its clutch hydraulics, or less preferably its brake hydraulics. One of the connections is provided with a variable restriction 34 to adjust the flow of fluid through the connection. The connection shown in FIG. 4 that has the variable restriction is the connection that is attached to the first volume 29 where the first volume 29 is the portion of the chamber through which the piston rod 26 does not run. The second volume 30 has the piston rod 26 running through it. The second connection is not provided with a variable restriction so a constant flow of fluid can flow through the connection. The hydraulic supply 33 and the variable restriction 34 may be controlled by an electronic control unit 35.

The hydraulic supply 33 may provide hydraulic fluid to both connections of the linear actuator 22 at the same pressure, and thus flow rate. The flow rate into the first volume can be controlled by the variable restriction and thus the pressure within the first volume can be controlled. As the piston rod 26 is present in the second volume 30 the surface area of the piston on the second volume side is smaller and so generates less force for a given pressure than the other side of the piston. This means the linear actuator can be controlled using only one variable restriction.

The linkage 24 in FIG. 3A is coupled to the linear actuator by a rocker 36. The rocker 36 is pivotally mounted to the wing support 12. The rocker 36 is pivotally mounted to the wing support at a third location on the wing support 12. The third location is positioned on the portion of the wing support that is located above a horizontal plane defined by the pivot at the first location on the wing where the wing support 12 is attached to the wing. Thus, the rocker 36 is pivotally mounted to the wing support 12 at a location above a horizontal plane defined by the first location 23 on the wing 5. The linkage 24 is pivotally attached to the rocker 36 at one end of the rocker 36. The linear actuator 22 is pivotally attached to the rocker 36 at the other end of the rocker 36. The axes about which the rocker 36 pivots with the wing support 12, the rocker 36 pivots with the linear actuator 22, and the rocker 36 pivots with the linkage 24 are all substantially parallel with each other. As can be seen in FIG. 3A, the distance between the linkage pivot with the rocker and the rocker pivot with the wing support may be less than the distance between the linear actuator pivot with the rocker and the rocker pivot with the wing support. This provides a mechanical advantage to the force provided by the linear actuator 22. The rocker 36 may have a curved profile in the plane perpendicular to the pivot axes so as to be accommodated within the profile of the wing support. The rocker 36 however may extend outside of the profile of the wing support during operation of the wing, for example during some of the rotational range of the wing 7.

As described herein, the linear actuator 22 may comprise a cylinder 27 and a rod 26. The cylinder 27 of the linear actuator 22 may be positioned below the horizontal plane defined by the pivot of the wing at the first location. The rod 26 of the actuator 26 can extend from the cylinder 27 to the rocker 36. The rod 26 is smaller in cross sectional area than the cylinder 27 and so means that the wing support 12 can be thinner in the region where air would flow past the wing support when the vehicle is in motion.

The wing support 12 may comprise stanchions 37, 38 by means of which the wing support 12 and hence the VAD can be attached to the body of the vehicle. The linear actuator 22, linkage 24 and/or the rocker 36 may be housed inside the outer shell of the wing support 12. The linear actuator 22, linkage 24 and/or the rocker 36 may be housed partially inside the outer shell of the wing support. During operation, at least part of the linear actuator 22, linkage 24 and/or the rocker 36 may protrude from the outer shell of the wing support 12, for example during part of the rotational range of the wing 7.

As discussed herein, the vehicle 1 may comprise two wing supports located at either end of the wing 7. The first and second wing supports are positioned either side of the centreline of the vehicle. The centreline running along the length of the vehicle. The pivotal attachments of each wing support to the wing can share a common axis. The vehicle 1 may comprise a plurality of wing supports 12 located along the length of the wing 7. For instance, the vehicle 1 may comprise three or more wing supports 12. The wing supports may be spaced along the length of the wing 7. Where there are more than one wing support 12, the respective actuators associated with each of those wing supports 12 may move in unison to move the wing 7 between the first position and the second position. The respective actuators associated with each of those wing supports may move individually which can cause a change in shape of the wing 7.

Figure 5A:
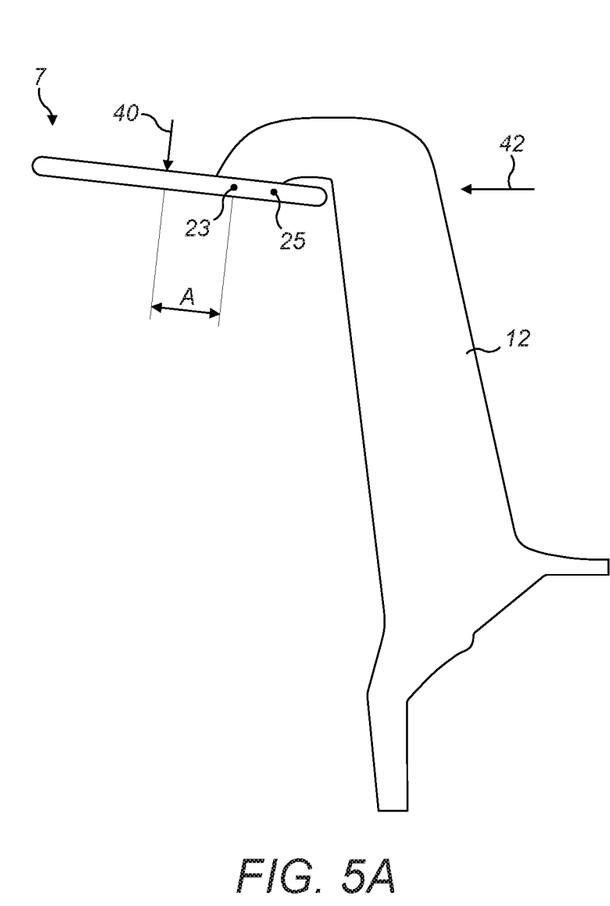
FIGS. 5A and 5B show schematic diagrams of the wing in the first and second positions relative to a wing support.
Figure 5B:
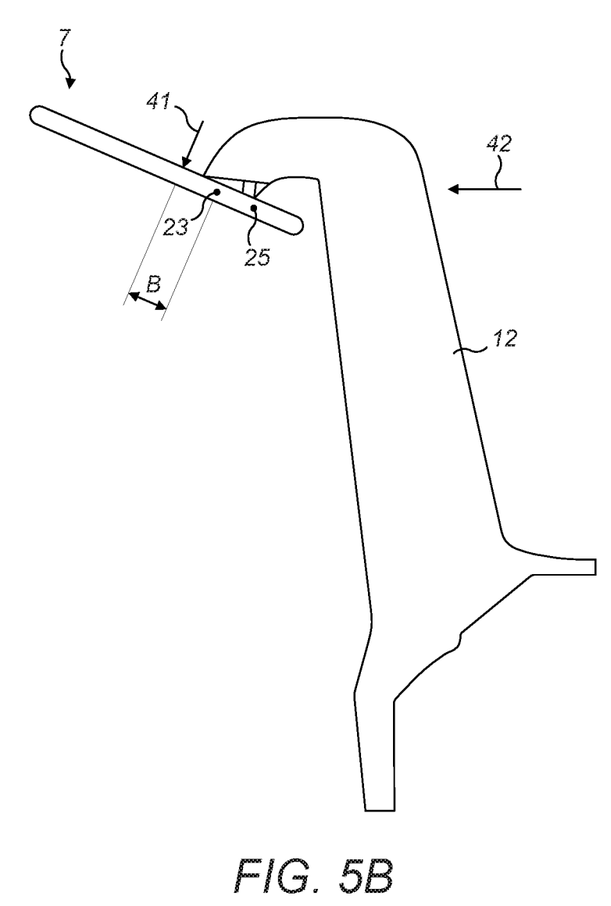

As discussed herein, the pivotal attachment of the wing 7 to the wing support 12 means that the wing 7 can rotate between a first position and a second position. FIG. 5A shows the wing in the first position. FIG. 5B shows the wing in the second position. The wing 7 can pivot about pivot point 23 to move between the first position and second position.

The wing 7 is shown schematically in FIGS. 5A and 5B and it will be appreciated that the wing 7 will generally have a different profile to that shown in FIGS. 5A and 5B. The wing support 12 is shown without the actuation components.

The wing 12 is configured so that when the wing 12 is in the first position, as shown in FIG. 5A, the wing 12 is streamlined so as to be capable of imposing a low rearward force on the vehicle body as a result of the action of rearward air flow 42 on the wing 7. The low rearward force on the vehicle body may be relative to the rearward force imposed on the vehicle body when the wing 7 is in the second position. This also means that the wing 12 may impose a low level of downforce on the vehicle body as a result of the action of rearward air flow 42 on the wing 7. The low level of downforce may be relative to the level of downforce imposed on the vehicle body when the wing 7 is in the second position. The profile of the wing 12 may be such as to generate the low rearward force and/or low level of downforce. The profile of the wing elements may be such as to generate the force.

The wing 12 is configured so that when the wing 12 is in the second position, as shown in FIG. 5B, the wing 12 is configured so that the wing 12 is capable of imposing a high downforce on the vehicle body as a result of the action of rearward air flow 42 on the wing 7. The downforce can act in a generally vertical direction through the wing supports to the vehicle body. The high downforce on the vehicle body may be relative to the downforce imposed on the vehicle body when the wing 7 is in the first position. This also means that the wing 12 may impose a high level of rearward force on the vehicle body as a result of the action of rearward air flow 42 on the wing 7. The high level of rearward force on the vehicle body may be relative to the rearward force imposed on the vehicle body when the wing 7 is in the first position. The profile of the wing 12 may be such as to generate the high level of downforce and/or high rearward force. The profile of the wing elements may be such as to generate the force.

Arrows 40 and 41 in FIGS. 5A and 5B respectively show the centre of pressure of the wing 7 in each of the first and second positions. They show the centre of pressure in a plane parallel with the longitudinal direction of the vehicle 1. The centre of pressure of the wing 7 may not be in a fixed position as the wing moves between the first and second positions. This is because the aerodynamic properties of the wing 7 can alter as the pitch of the wing is adjusted. This means that the centre of pressure may move as the aerodynamic properties of the wing 7 change. The centre of pressure is the point through which the downforce of the wing 7 is taken to act when acted upon by a rearward air flow 42. The centre of pressure is the point where the total sum of the rearward air flow 42 acts on the wing 7 causing the downforce to act through this point. As shown in FIGS. 5A and 5B where the centre of pressure in the planes parallel to the longitudinal direction of the vehicle 1 are at different distances from the first location 23 on the wing. As shown in FIGS. 5A and 5B, distance A is larger than distance B. However, the opposite could also be true depending on the design of the wing. In both cases the centre of pressure is rearward of the first location 23. Thus, also at any point between the first and second positions the centre of pressure is also rearward of the first location 23. The profile of the wing 7 can be chosen to make sure that the centre of pressure is rearward of the first location over the rotational range of the wing 7. The centre of pressure of the wing 7 can be modelled, for example using computational fluid dynamics to ensure that the centre of pressure remains behind the first location for all rotational positions of the wing.

The centre of pressure being rearward of the first location means that the downforce generated by the wing 7 in by rearward air flow 42 on the wing 7 always generates a moment in one direction about the first location 23. This means that a positive force acts on the linkage via the connection to the wing at the second location irrespective of the rotational position of the wing 7. The wing 7 can be at any point at or between the first and second positions and generate a positive, compressive force on the linkage in the presence of a rearward airflow over the wing 7. This means that the wing causes a positive, compressive force to be exerted on the linear actuator as a result of the action of rearward airflow on the wing. This is advantageous as it simplifies the control system required to operate the linear actuator as the linear actuator only needs to be controlled to provide force in one direction. The linear actuator only needs to be configured to provide a variable positive force against the linkage (i.e. pushing the linkage) and does not need to provide a variable negative force against the linkage (i.e. pulling the linkage) as the wing 7 is always attempting to move in one direction when rearward airflow is applied to it. This also can mean that the linear actuator can be provided in a smaller package meaning that it can fit inside the wing support 12 whilst allowing the wing support 12 to be streamlined to provide low resistance to air passing the wing support.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle, comprising:
   a vehicle body;
   a wing having an upper side and a front;
   a wing support mounted between the vehicle body and the wing, the wing support extending from the upper side of the wing, around the front of the wing, to the vehicle body and being pivotally attached to the wing at a first location on the wing so that the first location is positionally fixed relative to the wing support and the wing can rotate between a first position and a second position;
   a linear actuator for moving the wing between the first position and the second position; and
   a linkage pivotally attached to the wing at a second location forwards of the first location and coupled to the linear actuator so that the linear actuator can move the wing between the first position and the second position;
   wherein the wing is capable of imposing a downforce on the wing support acting through a centre of pressure of the wing as a result of the action of rearward airflow on the wing and the centre of pressure is located rearwards of the first location irrespective of the position of the wing.

2. A vehicle as claimed in claim 1, wherein the wing has a rear and the wing support does not pass around the rear of the wing.

3. A vehicle as claimed in claim 1, the vehicle comprising a rocker pivotally mounted to the wing support, wherein the linkage is coupled to the linear actuator by the rocker.

4. A vehicle as claimed in claim 3, wherein the linkage is pivotally attached to the rocker at one end of the rocker and the linear actuator is pivotally attached to the rocker at the other end of the rocker.

5. A vehicle as claimed in claim 3, wherein the rocker is pivotally mounted to the wing support between where the rocker is attached to the linkage and where the rocker is attached to the linear actuator.

6. A vehicle as claimed in claim 1, the wing support comprising an outer shell, wherein the linear actuator is housed inside the outer shell of the wing support, the linkage is housed inside the outer shell of the wing support, and the rocker is housed inside the outer shell of the wing support.

7. A vehicle as claimed in claim 1, the vehicle comprising a mount for the linear actuator and the linear actuator is pivotally attached to the mount.

8. A vehicle as claimed in claim 1, wherein irrespective of the position of the wing the wing causes a positive force to be exerted on the linear actuator as a result of the action of rearward airflow on the wing.

9. A vehicle as claimed in claim 1, the linear actuator comprises a chamber, a piston dividing the chamber into a first volume and a second volume, the piston being moveable along the length of the chamber to vary the size of the first and second volumes, and a piston rod coupled to the piston so that the piston rod moves with the piston, the piston rod being coupled to the linkage, the linear actuator further comprises a first connection between the first volume and the exterior of the linear actuator, and a second connection between the second volume and the exterior of the linear actuator, the connections being capable of providing coupling for fluid within the chamber with apparatus external to the linear actuator, wherein one of the connections is provided with a variable restriction to adjust the flow of fluid through the connection.

10. A vehicle as claimed in claim 1, wherein the wing is configured so that in the first position the wing is streamlined so as to be capable of imposing a low rearward force on the vehicle body as a result of the action of rearward airflow on the wing relative to the rearward force imposed on the vehicle body when the wing is in the second position.

11. A vehicle as claimed in claim 1, wherein the wing is configured so that in the second position the wing is capable of imposing a high downforce on the vehicle body as a result of the action of rearward airflow on the wing relative to the downforce imposed on the vehicle body when the wing is in the first position.

12. A vehicle as claimed in claim 1, wherein the wing comprises a main wing element and the wing support is mounted between the vehicle body and the main wing element.

13. A vehicle as claimed in claim 1, the wing comprises a plurality of wing elements.

14. A vehicle as claimed in claim 12, wherein the wing element(s) have profile(s) such that in the first position the wing is streamlined so as to be capable of imposing a low rearward force on the vehicle body as a result of the action of rearward airflow on the wing relative to the rearward force imposed on the vehicle body when the wing is in the second position.

15. A vehicle as claimed in claim 12, wherein the wing element(s) have profile(s) such that in the second position the wing is capable of imposing a high downforce on the vehicle body as a result of the action of rearward airflow on the wing relative to the downforce imposed on the vehicle body when the wing is in the first position.

16. A vehicle as claimed in claim 1, wherein the wing support is mounted to the vehicle body at a rear portion of the vehicle body.

17. A vehicle as claimed in claim 1, wherein the vehicle comprises:
   a second wing support mounted between the vehicle body and the wing, the second wing support extending from the upper side of the wing, around the front of the wing, to the vehicle body and being pivotally attached to the wing at a third location on the wing so that the third location is positionally fixed relative to the wing support and the wing can rotate between a first position and a second position;
   a second linear actuator for moving the wing between the first position and the second position; and
   a second linkage pivotally attached to the wing at a fourth location forwards of the second location and coupled to the linear actuator so that the linear actuator can move the wing between the first position and the second position;
   wherein the wing is capable of imposing a downforce on the wing support acting through the centre of pressure of the wing as a result of the action of rearward airflow on the wing and the centre of pressure is located rearwards of the third location irrespective of the position of the wing.

18. A vehicle as claimed in claim 17, wherein the first and second wing supports are positioned either side of a centreline of the vehicle.

19. A vehicle as claimed in claim 17, wherein the first and third locations are co-planar, and the second and fourth locations are co-planar.

20. A vehicle as claimed in claim 17, wherein the pivotal attachment of the first wing support to the wing and the pivotal attachment of the second wing support to the wing share a common axis.

* * * * *